United States Patent [19]
Gibson et al.

[11] Patent Number: 5,377,127
[45] Date of Patent: Dec. 27, 1994

[54] SOFTWARE CALIBRATION OF SPEED SENSORS

[75] Inventors: Patrick W. Gibson, Northville; Todd A. Snover, Oak Park; Dale O. Stollsteimer, W. Bloomfield, all of Mich.

[73] Assignee: Ford Motor Company, Dearborn, Mich.

[21] Appl. No.: 151,699

[22] Filed: Nov. 15, 1993

[51] Int. Cl.⁵ .................... G06F 15/20; G01P 21/00
[52] U.S. Cl. .................... 364/571.01; 73/2; 324/160; 364/565; 364/571.04
[58] Field of Search ............. 73/2; 324/160; 364/565, 364/571.01, 571.02, 571.04

[56] References Cited
U.S. PATENT DOCUMENTS
4,931,939  6/1990  Kawata et al. ............. 364/424.1 X Primary Examiner—Edward R. Cosimano
Attorney, Agent, or Firm—Peter Abolins; Roger L. May

[57] ABSTRACT

This is a method and apparatus for operating a transfer case of a four wheel drive vehicle wherein sensors detecting rotation of the front and rear drive shafts speed are scaled to produce an advantageously accurate representation of vehicle speed. The method generates a scaling factor by comparing stored information to information sensed by rotational sensors on the front and rear drive shaft.

9 Claims, 2 Drawing Sheets

SOFTWARE CALIBRATION OF SPEED SENSORS

BACKGROUND OF THE INVENTION

1. Field of the Invention

This invention relates to sensors for electronic control of a vehicle powertrain.

2. Prior Art

Four wheel drive systems can use transfer cases to apply drive line power from an input shaft coupled from the transmission and engine to a rear drive shaft coupled to the rear wheels and to a front drive shaft coupled to the front wheels. Selecting whether power is applied to the rear drive shaft, the front drive shaft or to both drive shafts is a function of the absolute and relative speeds of the front and rear drive shafts and of processing done by a transfer case controller. Typically, sensors are coupled to the front and rear drive shafts to determine speed of rotation of the drive shafts. It is known to use various coupling gears to provide a fixed scaling ratio which can be used to convert the output signal of the sensor coupled to the drive shaft to indicate the speed of rotation of the associated wheels. Thus the transfer case controller assumes a fixed sensor calibration for all vehicles and uses a fixed sensor calibration constant.

However, the use of such coupling gears presents a problem because it increases the number of parts, and introduces the possibility of error by installation of the wrong part. Further, the particular gear ratio of the coupling gear is uniquely determined as a function of the vehicle and its driveline/powertrain configuration and thus must be appropriately matched.

It would be advantageous to have a system which automatically calibrates a sensor associated with the drive shafts to produce an indication of tire rotation or vehicle speed. These are some of the problems this invention overcomes.

SUMMARY OF THE INVENTION

A method of operating a four wheel drive system is used to scale or calibrate a sensor input for a particular vehicle tire size and axle ratio. Front and rear drive shaft sensors are thus calibrated so that accurate speed measurements can be made and drive line control to the front and rear drive shafts managed advantageously. The vehicle speed is determined and a rotational signal indicating rear drive shaft rotational speed is generated. The rotational speed of the rear drive shaft is correlated to the vehicle speed and a scaling factor is determined relating the rotational signal of the rear drive shaft to vehicle speed.

DETAILED DESCRIPTION OF THE INVENTION

Figure 1:
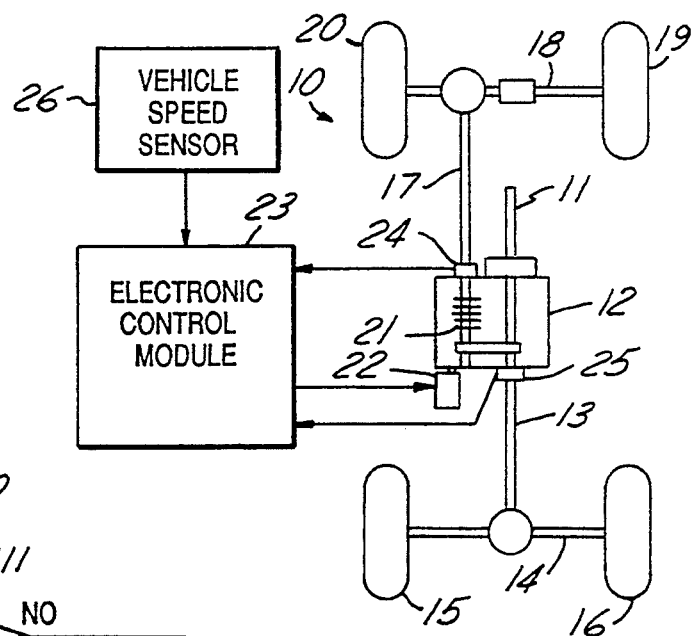
FIG. 1 is a schematic diagram of a four wheel drive system in accordance with an embodiment of this invention.

Referring to FIG. 1, a four wheel drive system 10 includes an input shaft 11 coupled to a transfer case 12. Transfer case 12 has a rear drive shaft 13 coupled to a rear axle 14 driving rear wheels 15 and 16. Transfer 12 also has an output of a front drive shaft 17 coupled to a front axle 18 driving front wheels 19 and 20. Transfer 12 includes a clutch 21 which couples input shaft 11 to front drive shaft 17. A shift motor 22 is coupled to clutch 21 and helps engage clutch 21. An electronic control module 23 has inputs from a front speed sensor 24 coupled to front drive shaft 17 and a rear speed sensor 25 coupled to rear drive shaft 13. Electronic control module 23 provides an input to shift motor 22 to actuate clutch 21. A vehicle speed sensor 26 provides an input to electronic control module 23, but may not be sufficiently accurate to be used to control torque application to front wheels 19, 20 and rear wheels 15, 16. Thus, electronic control module 23 provides a method of operating the vehicle wherein the vehicle experiences an ignition cycle and the step of determining the rear scaling factor is done once every ignition cycle.

Figure 2:
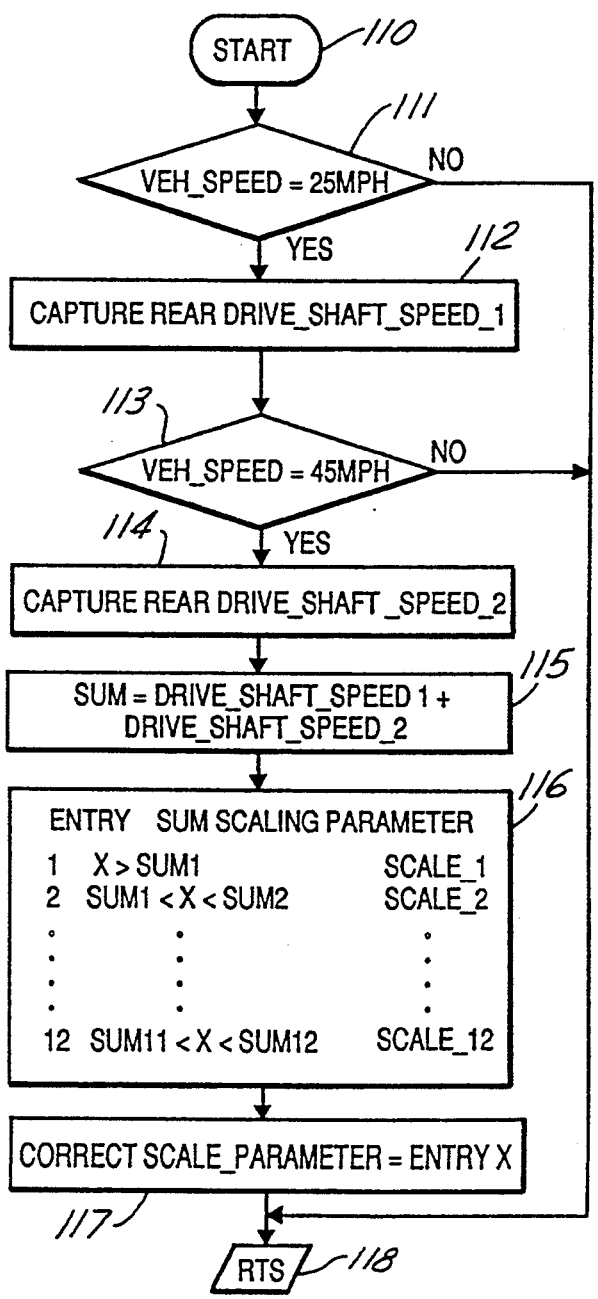
FIG. 2 is a logic flow diagram of a software calibration technique in accordance with an embodiment of this invention.

The strategy stored in electronic control module 23 is shown in FIG. 2. Referring to FIG. 2, the process begins in a start block 110. From start block 110, logic flow proceeds to a decision block 111, where it is determined if the vehicle's speed is 25 miles per hour (and has remained between 20 mph and 30 mph for at least 2 seconds). If the vehicle's speed is 25 mph, the rear drive shaft angular velocity (speed) is captured and stored as speed 1, as shown in a block 112. From block 112, logic flow proceeds to a decision block 113. If in decision block 111 it was determined that vehicle speed was not 25 mph, logic flow proceeds to a block 118.

In decision block 113, it is determined if the vehicle's speed is 45 mph. If it is not, the subroutine is initiated again at start block 110 by passing through an RTS block (return to subroutine start) 118. If vehicle speed is 45 mph, logic flow proceeds to a block 114, where rear drive shaft angular velocity (speed 2) is captured, and stored. From block 114, logic flow proceeds to a block 115, where the sum of speed 1, and speed 2 is determined. From block 115, logic flow proceeds to a block 116, the captured sum of speed 1 and speed 2 is fed into a predetermined lookup table (based on the vehicle's tire size and axle ratio) to determine the scaling parameter.

From block 116, logic flow proceeds to block 117, where the scale parameter is used to control the transfer case torque transfer. From block 117, logic flow proceeds to block 118, which returns the logic flow to the beginning of the subroutine. This entire process occurs once every ignition cycle.

In accordance with the above steps, electronic control module 23 operates to scale the raw signal input obtained from front speed sensor 24 and rear speed sensor 25. The scaled sensor inputs are used in computing the duty cycle applied to clutch 21, which in turn is used to deliver torque to front wheels 19 and 20 of the four wheel drive vehicle. When using a calibration method in accordance with an embodiment of this invention the wave form period from rear speed sensor 25 is captured in the microprocessor in the form of central processing unit clock cycles. The capture takes place at vehicles speeds of 25 mph and 45 mph once per controller initiation cycle. The sum of the two captured readings is used to determine from a lookup table which one of twelve prestored conversion constants should be used in scaling the raw speed signal inputs. The selected, prestored conversion constant will be used in place of a default constant.

The captured sum will be larger or smaller depending on the vehicle's tire size and axle ratio. The twelve prestored conversion constants refer to the frequency, in hertz per kilometer per hour, that will be used to scale the drive shaft inputs.

Vehicle speed indications of 25 mph and 45 mph are obtained from a separate calibrated vehicle speed sensor input to the microprocessor controller. The capture at 25 mph will only take place after the vehicle has been traveling between 20 and 30 mph for least two seconds. Analogously, the capture at 45 mph occurs only when the vehicle has been traveling between 40 and 50 mph for two seconds and the 25 mph capture has already been completed. Two vehicle speeds are advantageously chosen to offset any inaccuracies in the scaled vehicle speed sensor. An example of a lookup table is as follows where sums 1 through 12 and scaling parameters 1 through 12 are predetermined constants:

| Entry # | Captured Sum x | Selected Scaling Parameter (hz/kph) |
|---|---|---|
| 1 | x > sum1 | 1 |
| 2 | sum1 < x < sum2 | 2 |
| 3 | sum2 < x < sum3 | 3 |
| 4 | sum3 < x < sum4 | 4 |
| 5 | sum4 < x < sum5 | 5 |
| 6 | sum5 < x < sum6 | 6 |
| 7 | sum6 < x < sum7 | 7 |
| 8 | sum7 < x < sum8 | 8 |
| 9 | sum8 < x < sum9 | 9 |
| 10 | sum9 < x < sum10 | 10 |
| 11 | sum10 < x < sum11 | 11 |
| 12 | sum11 < x < sum12 | 12 |

Figure 3:
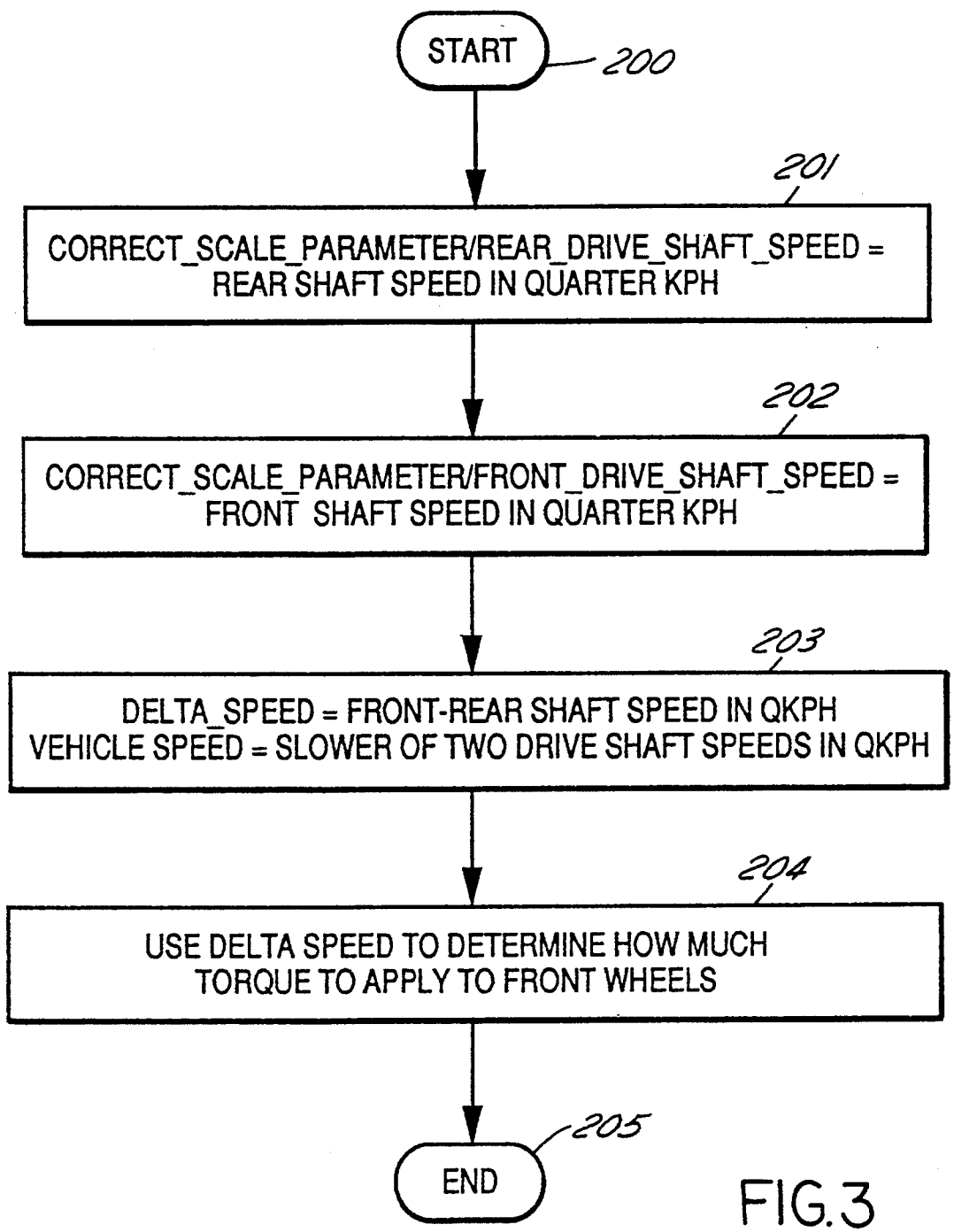
FIG. 3 is a logic flow diagram for using a scaling factor in accordance with an embodiment of this invention.

Referring to FIG. 3, a logic flow diagram shows how the system uses the scaling parameter developed in accordance with the seeps of FIG. 2. More specifically, at a block 200 the process starts. Logic flow then goes to a block 201 wherein the correct scale parameter is divided by the rear drive shaft speed in order to get the rear drive shaft speed in quarter kilometers per hour. Logic flow then goes to a block 202 wherein the correct scale parameter is divided by the front drive shaft speed in order to get the front shaft speed in quarter kilometers per hour. Logic flow then goes to a block 203 wherein delta speed is set equal to the front shaft speed in quarter kilometers per hour less the rear shaft speed in quarter kilometers per hour, and the vehicle speed is set equal to the slower of the two drive shaft speeds in quarter kilometers per hour. Logic flow then goes to a block 204 wherein the delta speed is used to determine how much torque to apply to the front wheels. Logic flow then goes to a block 205 which ends the action.

Various modifications and variations will no doubt occur to those skill in the art to which this invention pertains. For example, the number of scaling parameters may be varied from the number disclosed herein. These and all other variations basically rely on the teachings through which this disclosure has advanced the art are properly considered within the scope of this invention.

What is claimed:

1. A method of calibrating rotational speed sensors of a front drive shaft and a rear drive shaft in a four wheel drive vehicle including the step of:
   determining a vehicle speed;
   generating a rotational signal indicating the rotational speed of a front drive shaft;
   generating a rotational signal indicating the rotational speed of a rear drive shaft;
   correlating the rotational speed of the front drive shaft to vehicle speed;
   correlating the rotational speed of the rear drive shaft to vehicle speed; and
   determining a scaling factor relating the rotational signals of the front and rear drive shafts to vehicle speed, whereby a calibration of the rotational speed sensors occurs after performing these recited steps.

2. A method as recited in claim 1 wherein the steps of correlating the front and rear rotational signals to vehicle speed include the steps of:
   determining if the vehicle speed is at a first predetermined vehicle speed;
   if yes, storing a signal indicating rotation of the rear drive shaft when the vehicle is at said first predetermined speed;
   determining if the vehicle speed is at a second predetermined speed;
   if yes, capturing as signal indicating rotation of the rear drive shaft when the vehicle is at said second predetermined speed;
   determining a signal sum of the signals indicating rear drive shaft speed at said first predetermined vehicle speed and said second predetermined vehicle speed; and
   determining a rear scaling factor by comparing the determined signal sum to predetermined values.

3. A method as recited in claim 2 wherein the step of determining a sear scaling factor includes the steps of:
   storing in a look up table a plurality of predetermined magnitude ranges for signal sums;
   associating with each of said plurality of signal sum ranges a predetermined scaling parameter; and
   determining which of the plurality of predetermined magnitude ranges for signal sums includes the determined signal sum and which associated predetermined scaling parameter is thus selected.

4. A method as recited in claim 3 wherein the vehicle experiences an ignition cycle and the step of determining the rear scaling factor is done once every ignition cycle.

5. A method as recited in claim 4 wherein the first vehicle speed is about 25 mph and the second predetermined vehicle speed is about 45 mph.

6. A method as recited in claim 5 wherein the steps of correlating the front and rear rotational signals to vehicle speed include the steps of:
   determining if the vehicle speed is at a first predetermined vehicle speed;
   if yes, storing a signal indicating rotation of the front drive shaft when the vehicle is at said first predetermined speed;
   determining if the vehicle speed is at a second predetermined speed;
   if yes, capturing a signal indicating rotation of the front drive shaft when the vehicle is at said second predetermined speed;
   determining a signal sum of the signals indicating front drive shaft speed at said first predetermined vehicle speed and said second predetermined vehicle speed; and
   determining a front scaling factor by comparing the determined signal sum to predetermined values.

7. A method as recited in claim 6 wherein the sequence of determining the rear and front scaling factors is first done for the rear drive shaft and then done for the front drive shaft.

8. An apparatus for calibrating rotational speed sensors of a front drive shaft and a rear drive shaft in a four wheel drive vehicle including:
- a vehicle speed sensor for scaling the speed of the vehicle and providing an output signal indicative of vehicle speed;
- a front drive shaft speed sensor for sensing the rotation speed of the front drive shaft and providing an output signal indicative of front drive shaft rotational speed;
- a rear drive shaft speed sensor for sensing the rotational speed of the rear drive shaft and providing an output signal indicative of rear drive shaft rotational speed;
- an electronic engine control module coupled to receive the outputs of the vehicle speed sensor, the front drive shaft speed sensor, and the rear drive shaft speed sensor, for processing information to determine the relative speed of the vehicle, the front drive shaft, the rear drive shaft, and to determine the relative application of driving power to the front and rear drive shafts and providing a drive train control output;
- a clutch means coupled to the output of the electronic engine control module for applying a drive force to the front drive shaft in response to signals from the electronic engine control module; and
- said electronic engine control module including:
  - means for comparing vehicle speed to a first predetermined vehicle speed;
  - means for comparing vehicle speed to a second predetermined vehicle speed;
  - means for capturing the rotational speed of the rear drive shaft speed at the first predetermined vehicle speed and the second predetermined vehicle speed;
  - means for determining a scaling factor for correlating vehicle speed and rear drive shaft speed comparing the sum determined to predetermined values, whereby a calibration of the rotational speed sensors is accomplished using this recited apparatus.

9. An apparatus for calibrating rotational speed sensors of a front drive shaft and a rear drive shaft in a four wheel drive vehicle as recited in claim 8 wherein said electronic engine control module includes a stored look up table including a plurality of predetermined magnitude ranges for signal sums and a predetermined scaling parameter being associated with each of the plurality of predetermined magnitude ranges for signal

* * * * *